(12) United States Patent
Lin

(10) Patent No.: US 9,946,246 B2
(45) Date of Patent: Apr. 17, 2018

(54) CONTROL METHOD OF A MACHINE TOOL

(71) Applicant: ANDERSON INDUSTRIAL CORP., Taipei (TW)

(72) Inventor: Chin-Chu Lin, Taipei (TW)

(73) Assignee: ANDERSON INDUSTRIAL CORP., Taipei (TW)

( * ) Notice: Subject to any disclaimer, the term of this patent is extended or adjusted under 35 U.S.C. 154(b) by 341 days.

(21) Appl. No.: 14/992,479

(22) Filed: Jan. 11, 2016

(65) Prior Publication Data

US 2017/0038759 A1     Feb. 9, 2017

(30) Foreign Application Priority Data

Aug. 7, 2015 (TW) ............... 104125812 A (51) Int. Cl.
    *G06F 19/00*     (2018.01)
    *G05B 19/402*     (2006.01)
    *B23Q 15/12*     (2006.01)

(52) U.S. Cl.
    CPC ........... *G05B 19/402* (2013.01); *B23Q 15/12* (2013.01); *G05B 2219/36224* (2013.01)

(58) Field of Classification Search
None
See application file for complete search history.

(56) References Cited

U.S. PATENT DOCUMENTS

2006/0283229 A1* 12/2006 Futamura .................. B30B 1/18
                                                            72/443
2016/0039014 A1* 2/2016 Uenishi ..................... B23C 1/14
                                                            700/192

\* cited by examiner

*Primary Examiner* — Robert Cassity
(74) *Attorney, Agent, or Firm* — Hamre, Schumann, Mueller & Larson, P.C.

(57) ABSTRACT

A control method of a machine tool includes the steps of: determining a raised height, and determining a maneuvering height; causing the tool to move horizontally to a machining position; causing the tool to move vertically to a machining height to machine the workpiece; causing the tool to move vertically to the raised height, and when the tool is at the maneuvering height, causing the tool to move horizontally to a next machining position while the tool is moving vertically; causing the tool to move vertically to the maneuvering height while the tool is moving horizontally to the next machining position; and causing the tool to move vertically to the machining height to machine the workpiece.

7 Claims, 5 Drawing Sheets

CONTROL METHOD OF A MACHINE TOOL

CROSS-REFERENCE TO RELATED APPLICATION

This application claims priority of Taiwanese Application No. 104125812, filed on Aug. 7, 2015.

FIELD

The disclosure relates to a control method, more particularly to a control method of a machine tool which accelerates machining of a plate-shaped workpiece.

BACKGROUND

Figure 1:
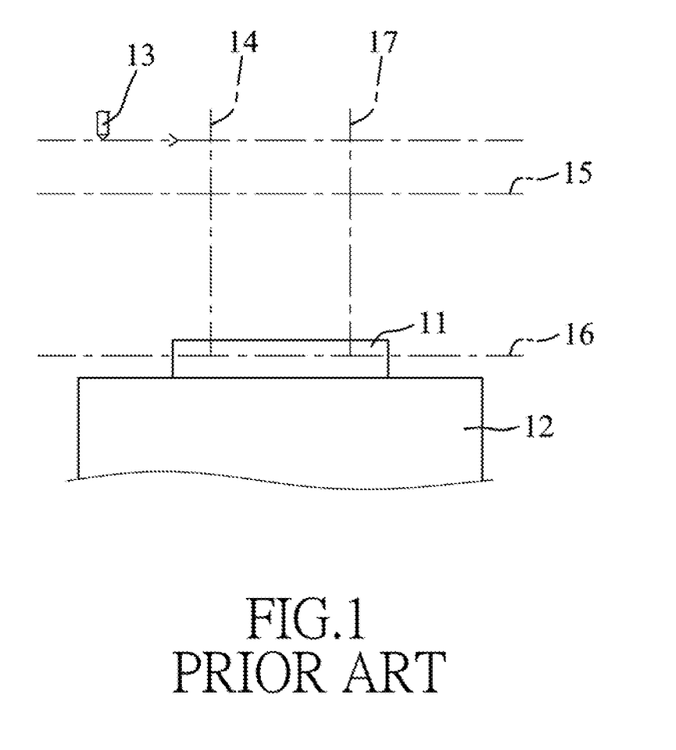
FIG. 1 is a schematic diagram illustrating a conventional machine tool.

A conventional machining method is to be performed by a machining system including a machine tool and a computer that is connected electrically to the machine tool and that is used to control operation of the machine tool. Referring to FIG. 1, the machine tool includes a table 12 for supporting a plate-shaped workpiece 11, and a tool 13 disposed relative to the table 12. When the workpiece 11 is to be machined, the computer (not shown) first controls the tool 13 to move horizontally to a machining position 14, next controls the tool 13 to move vertically toward the workpiece 11 to a stand-by height 15, and then controls the tool 13 to move vertically toward the workpiece 11 to a machining height 16 to machine the workpiece 11. After that, the computer controls the tool 13 to move vertically back to the stand-by height 15, and later controls the tool 13 to move horizontally to a next machining position 17. When the tool 13 has been moved to arrive at the next machining position 17, the computer controls the tool 13 to move vertically toward the workpiece 11 once again to the machining height 16 to machine the workpiece 11, and finally controls the tool 13 to move vertically away from the workpiece 11 and back to the stand-by height 15. The aforementioned steps are performed repeatedly to implement machining operation.

It is evident from the above that, in the conventional machining method, the tool 13 is moved either horizontally or vertically. However, the aforementioned approach for moving the tool 13 is relatively inefficient, and the overall time required for the machining operation is increased.

SUMMARY

Accordingly, how to optimize the motion path of a tool for promoting machining efficiency is an issue to be solved in the relevant art.

Therefore, an object of the disclosure is to provide a control method of a machine tool that can accelerate machining operation, and a computer program product including program instructions associated with the control method.

According to a first aspect of the disclosure, the control method of a machine tool is to be implemented by a machining system that includes the machine tool and a computer connected electrically to the machine tool. The machine tool includes a table for supporting a workpiece to be machined, and a tool unit disposed relative to the table and including a tool for machining the workpiece. The computer is programmed to control operation of the machine tool, and stores positional information associated with the tool for machining the workpiece, a stand-by height with respect to a supporting surface of the table, a preset machining height with respect to the supporting surface, a preset first deviation value and a preset second deviation value. The control method includes the following steps of:

by the computer, determining a raised height with respect to the supporting surface which is lower than the stand-by height, and determining, according to the raised height and the preset first deviation value, a maneuvering height with respect to the supporting surface which is lower than the raised height;

causing, by the computer, the tool to move horizontally to a machining position according to the positional information;

when the tool has arrived at the machining position, causing, by the computer, the tool to move vertically toward the workpiece to the machining height to machine the workpiece;

by the computer, causing the tool to move vertically away from the workpiece to the raised height, and when the tool is at the maneuvering height, causing the tool to move horizontally to a next machining position according to the positional information while the tool is moving vertically away from the workpiece to the raised height;

when it is determined that a horizontal distance between a current position of the tool and the next machining position is equal to the preset second deviation value, causing, by the computer, the tool to move vertically toward the workpiece to the maneuvering height while the tool is moving horizontally to the next machining position; and when the tool has arrived at the next machining position, causing, by the computer, the tool to move vertically toward the workpiece to the machining height to machine the workpiece.

According to a second aspect of the disclosure, the computer program product includes a machine readable non-transitory storage medium having program instructions stored therein which when executed cause a machining system to perform a control method of a machine tool. The machining system includes the machine tool and a computer connected electrically to the machine tool. The machine tool includes a table for supporting a workpiece to be machined, and a tool unit disposed relative to the table and including a tool for machining the workpiece. The computer is programmed to control operation of the machine tool, and stores positional information associated with the tool 321 for machining the workpiece, a stand-by height with respect to a supporting surface of the table, a preset machining height with respect to the supporting surface, a preset first deviation value and a preset second deviation value. The control method includes the following steps of:

by the computer, determining a raised height with respect to the supporting surface which is lower than the stand-by height, and determining, according to the raised height and the preset first deviation value, a maneuvering height with respect to the supporting surface which is lower than the raised height;

causing, by the computer, the tool to move horizontally to a machining position according to the positional information;

when the tool has arrived at the machining position, causing, by the computer, the tool to move vertically toward the workpiece to the machining height to machine the workpiece;

by the computer, causing the tool to move vertically away from the workpiece to the raised height, and when the tool is at the maneuvering height, causing the tool to move horizontally to a next machining position according to the positional information while the tool is moving vertically away from the workpiece to the raised height;

when determining that a horizontal distance between a current position of the tool and the next machining position is equal to the preset second deviation value, causing, by the computer, the tool to move vertically toward the workpiece to the maneuvering height while the tool is moving horizontally to the next machining position; and when the tool has arrived at the next machining position, causing, by the computer, the tool to move vertically toward the workpiece to the machining height to machine the workpiece.

An effect of the disclosure resides in that, by means of the computer which controls the tool unit to cause the tool to move vertically and horizontally at the same time, the motion path of the tool is optimized. In this way, time required for machining operation may be reduced, and machining efficiency may be promoted.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 2:
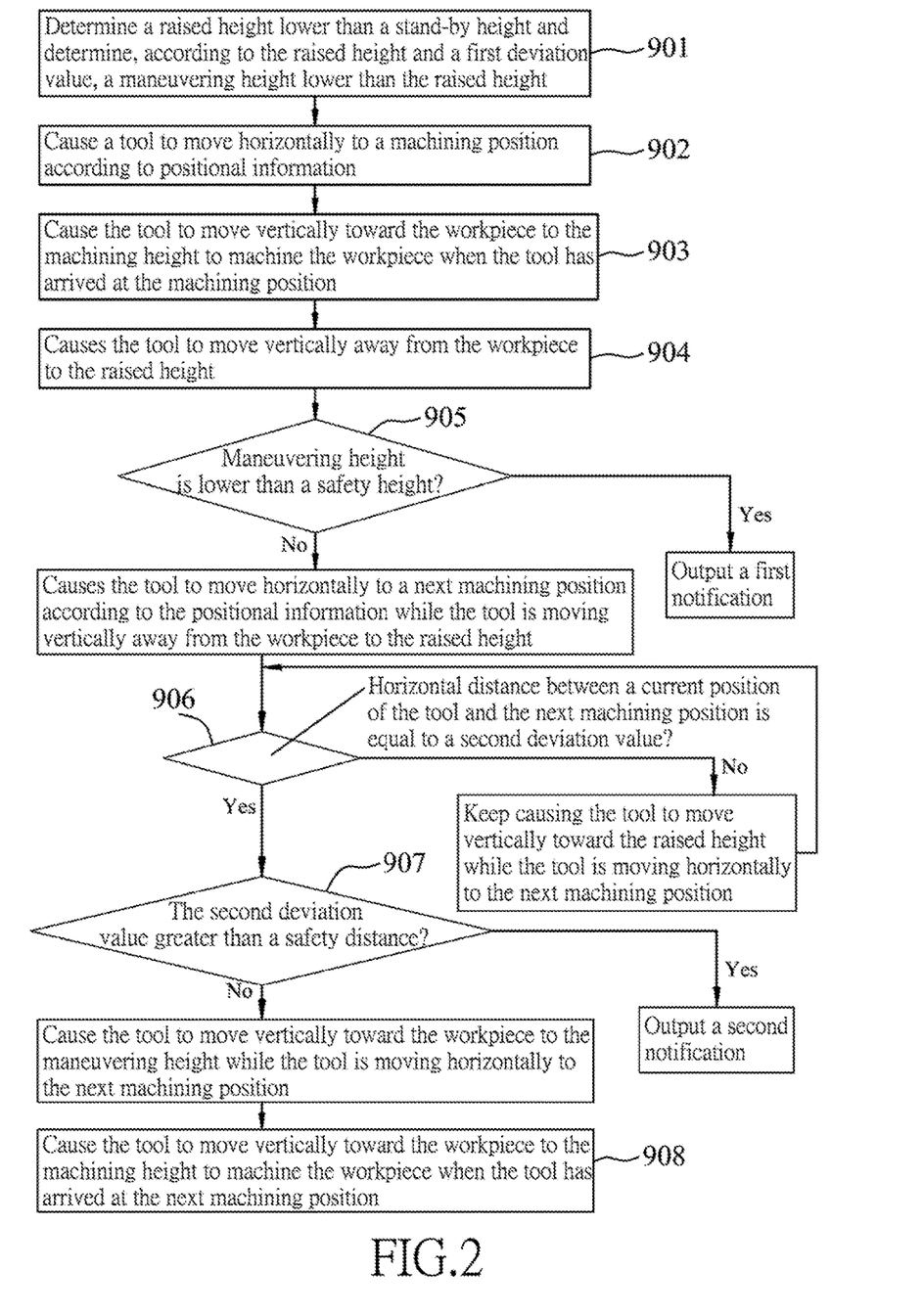
FIG. 2 is a flow chart illustrating an embodiment of a control method of a machine tool according to the disclosure.
Figure 3:
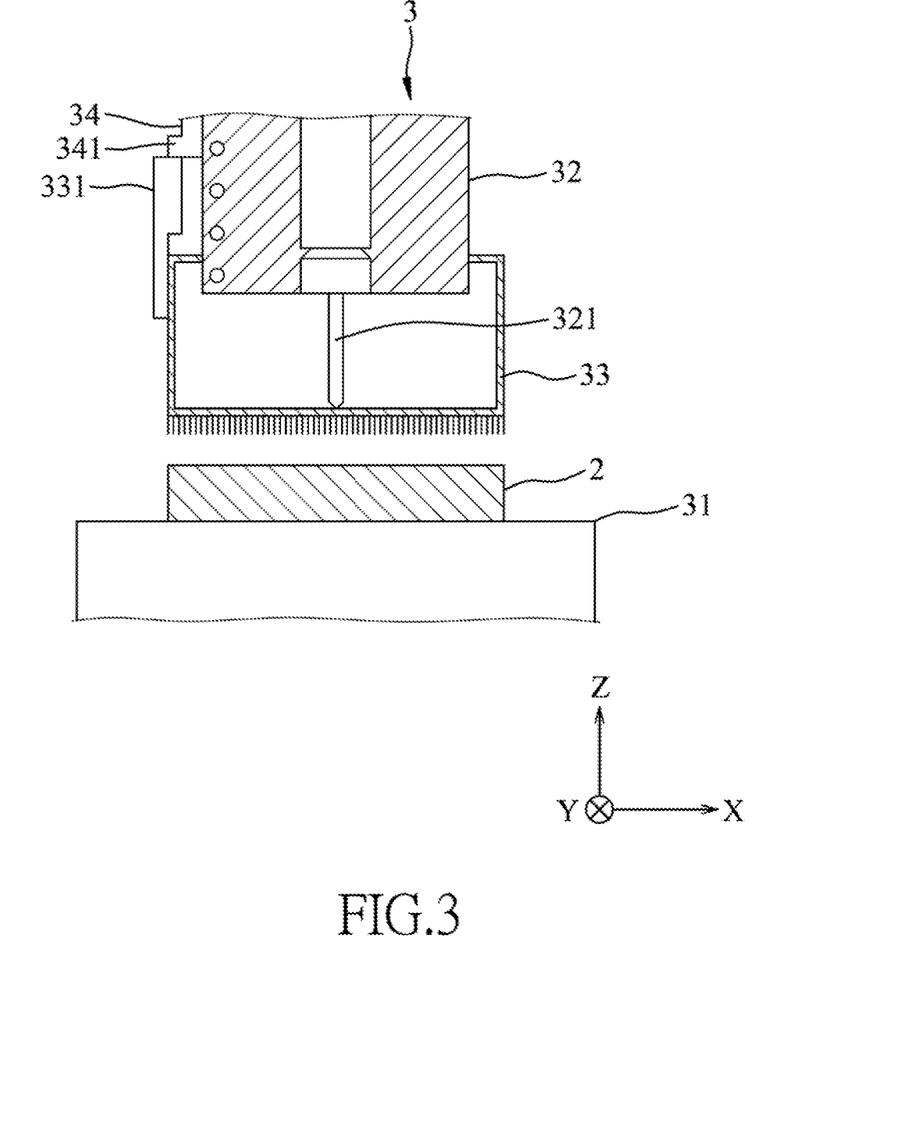
FIG. 3 is a partially-sectional schematic view of an embodiment of the machine tool with an extension member in a normally closed position.
Figure 5:
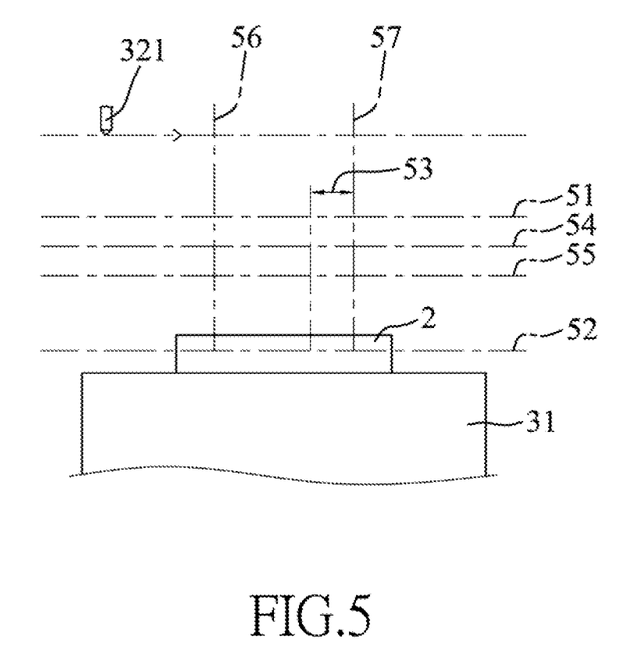
FIG. 5 is a schematic diagram illustrating machining operation of an embodiment of the control method according to the disclosure.

Referring to FIG. 2, FIG. 3 and FIG. 5, an embodiment of a control method of a machine tool according to the disclosure includes steps 901 to 908. In one embodiment, the control method is applicable to machining a plate-shaped workpiece 2, and is to be implemented by a machining system that includes a machine tool 3 and a computer (not shown) connected electrically to the machine tool 3.

The machine tool 3 includes a table 31 for supporting the workpiece 2, a tool unit 32 disposed relative to the table 31, a brush frame unit 33 sleeved onto the tool unit 32 and located between the tool unit 32 and the table 31, and a sensor unit 34 disposed on the tool unit 32 and connected electrically to the computer. The workpiece 2 is placed onto a supporting surface of the table 31.

The tool unit 32 includes a tool 321 which is used for machining the workpiece 2. By defining a three-dimensional coordinate space having an X-axis, a Y-axis and a Z-axis, the tool unit 32 is controllable to move horizontally on a coordinate plane defined by the X-axis and Y-axis, and to move vertically along the Z-axis.

The brush frame unit 33 is movable relative to the tool unit 32 when the tool unit 32 is machining the workpiece 2. The brush frame unit 33 includes an extension member 331 which extends from a main body of the brush frame unit 33 and away from the table 31 and which is configured to interact with the sensor unit 34.

The sensor unit 34 includes a sensor switch 341, and is used to detect a moving distance of the brush frame unit 33 relative to the tool unit 32 when the workpiece 2 is being machined.

The computer is programmed to control operation of the machine tool 3, and stores computer program used for machining the workpiece 2. The computer further stores positional information associated with the tool 321 for machining the workpiece 2, a stand-by height 51 with respect to the supporting surface of the table 31, a preset machining height 52 with respect to the supporting surface, a preset first deviation value, a preset second deviation value 53, and a preset height setting value. In one embodiment, the machine tool 3 is a boring machine tool for drilling holes in the workpiece 2.

Figure 4:
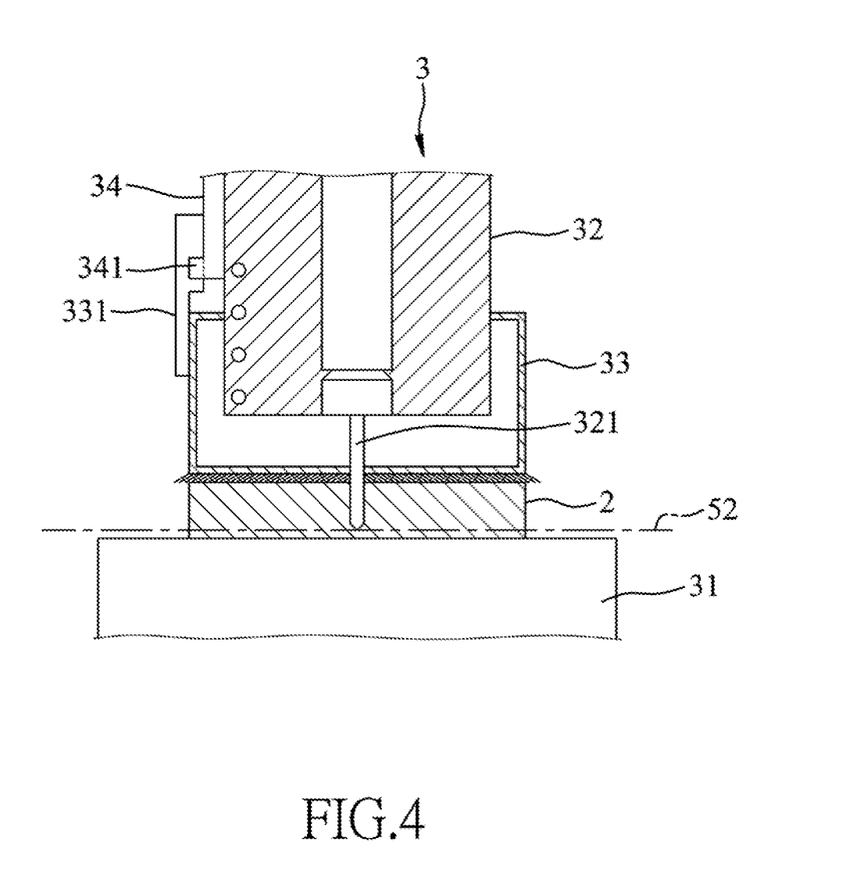
FIG. 4 is a partially-sectional schematic view of an embodiment of the machine tool with the extension member in a normally open position.

Referring to FIG. 3 in combination with FIG. 4 and FIG. 5, the brush frame unit 33 is sleeved onto to tool unit 32. The extension member 331 is movable relative to the sensor switch 341 between a normally closed position (FIG. 3) and a normally open position (FIG. 4). In the normally closed position, the extension member 331 is separated from the sensor switch 341, and the sensor switch 341 determines and indicates that the extension member 331 is in the normally closed position. Referring to FIG. 3, when the machine tool 3 is in a stand-by status, the extension member 331 is in the normally closed position.

On the other hand, in the normally open position, the extension member 331 is in contact with the sensor switch 341, and the sensor switch 341 determines and indicates that the extension member 331 is in the normally open position. Referring to FIG. 4, when the machine tool 3 is used to machine the workpiece 2, the tool unit 32 is moved vertically toward the workpiece 2, bringing along the brush frame unit 33, to place the tool 321 at the machining height 52. During the above movement, once the brush frame unit 33 touches the workpiece 2, the brush frame unit 33 is pushed by the workpiece 2 to move relative to the tool unit 32 in a direction opposite to that in which the tool unit 32 moves, such that the extension member 331 is moved toward the sensor switch 341. When the extension member 331 touches the sensor switch 341, the extension member 331 is detected as being in the normally open position. The moving distance of the brush frame unit 33 relative to the tool unit 32 is equal to a distance the extension member 331 is moved from the normally closed position to the normally open position.

In one embodiment, the sensor switch 341 is exemplified as an optical sensor. When the extension member 331 touches the sensor switch 341 to result in changes in light beams the sensor switch 341 measures, the normally open position of the extension member 331 can be detected. In another embodiment, the sensor switch 341 may be exemplified as a touch sensor.

Referring to FIG. 2, FIG. 3 and FIG. 5, one embodiment of the control method of a machine tool is implemented by a computer program which is stored in the computer associated with machining of the workpiece 2. The computer program, when executed, causes the computer to control the machine tool 3 to perform the steps of the embodiment of the control method.

In step 901, the computer controls the machine tool 3 to machine the workpiece 2 a predetermined number of times. The sensor unit 34 detects the moving distance of the brush frame unit 33 each time the workpiece 2 is machined. The computer calculates an average of the moving distances detected the predetermined number of times, and calculates a total of the average of the moving distances, the machining height 52 and the preset height setting value to serve as a raised height 54 with respect to the supporting surface. In this way, the computer determines the raised height 54 which is lower than the stand-by height 51. The computer further determines, according to the raised height 54 and the preset first deviation value, a maneuvering height 55 with respect to the supporting surface which is lower than the raised height 54 and which is equal to the raised height 54 minus the preset first deviation value.

In step 902, the computer causes the tool 321 to be moved horizontally to a machining position 56 on the coordinate plane according to the positional information.

In step 903, when the tool 321 has arrived at the machining position 56, the computer causes the tool 321 to be moved vertically along the Z-axis toward the workpiece 2 to the machining height 52 to machine the workpiece 2.

In step 904, the computer causes the tool 321 to be moved vertically away from the workpiece 2 along the Z-axis to the raised height 54.

In step 905, when the tool 321 is at the maneuvering height 55, the computer determines whether the maneuvering height 55 is lower than a safety height with respect to the supporting surface. In one embodiment, the safety height is equal to a half of the raised height 54. When it is determined by the computer that the maneuvering height 55 is lower than the safety height, it means that the maneuvering height 55 is insufficient, and the computer outputs a first notification to indicate that the maneuvering height is improper. Otherwise, when it is determined by the computer that the maneuvering height 55 is not lower than the safety height, the computer causes the tool 321 to be moved horizontally to a next machining position 57 on the coordinate plane according to the positional information while the tool 321 is moving vertically away from the workpiece 2 to the raised height 54. In one embodiment, the speed at which the tool 321 is moved vertically away from the workpiece 2 is equal to the speed at which the tool 321 is moved horizontally to the next machining position 57. In other words, the tool 321 is moved inclinedly toward the next machining position 57 and away from the workpiece 2.

In step 906, the computer determines whether a horizontal distance between a current position of the tool 321 and the next machining position 57 is equal to the preset second deviation value 53. When it is determined by the computer that the horizontal distance between the current position of the tool 321 and the next machining position 57 is equal to the preset second deviation value 53, the flow proceeds to step 907. Otherwise (i.e., the horizontal distance between the current position of the tool 321 and the next machining position 57 is not equal to the preset second deviation value 53), the computer keeps on causing the tool 321 to be moved vertically toward the raised height 54 while the tool 321 is moving horizontally to the next machining position 57.

In step 907, the computer determines whether the preset second deviation value 53 is greater than a safety distance. In one embodiment, the safety distance is equal to half of a horizontal distance between the machining position 56 which the tool 321 has previously visited and the next machining position 57. When it is determined by the computer that the preset second deviation value 53 is greater than the safety distance, it means that the preset second deviation value 53 is an unreasonable distance, and the computer outputs a second notification to indicate that the preset second deviation value is improper. Otherwise (i.e., the preset second deviation value 53 is not greater than the safety distance), the computer causes the tool 321 to be moved vertically toward the workpiece 2 to the maneuvering height 55 while the tool 321 is moving horizontally to the next machining position 57. In one embodiment, the speed at which the tool 321 is moved vertically toward the workpiece 2 is equal to the speed at which the tool 321 is moved horizontally to the next machining position 57. In other words, the tool 321 is moved inclinedly toward the next machining position 57 and toward the workpiece 2.

In step 908, when the tool 321 has arrived at the next machining position 57, the computer causes the tool 321 to be moved vertically toward the workpiece 2 to the machining height 52 to machine the workpiece 2.

It should be noted that, during the machining operation, the computer further determines whether the sensor switch 341 has detected movement of the extension member 331 between the normally closed position and the normally open position. When it is determined by the computer that the sensor switch 341 has detected movement of the extension member 331 between the normally closed position and the normally open position, it means that the machine tool 3 operates normally. Otherwise, malfunction of the machine tool 3 may have occurred, and the computer controls the tool unit 32 to cause the tool 321 to move back to the stand-by height 51.

In the disclosure, the phrases such as "vertical", "vertically", "horizontal" and "horizontally", as used throughout this specification are relative, and not absolute, positional terms, and are used in combination with FIG. 3, FIG. 4 and FIG. 5, for clear and easy explanation of the control method of a machine tool. In practice, the machine tool 3 is not limited to a vertical boring machine tool, and may be implemented as, for example, a horizontal boring machine tool, among others.

To sum up, the control method of a machine tool according to the disclosure, and the computer program product of the control method, by means of the computer executing the computer program, are able to determine the raised height 54 lower than the stand-by height 51, so as to reduce the distance the tool 321 has to travel vertically away from the workpiece 2. Moreover, by controlling the tool unit 32 to cause the tool 321 to move horizontally and vertically at the same time, the motion path of the tool 321 may be optimized, so as to reduce time cost for the machining operation and promote efficiency. By determining whether the machine tool 3 operates normally, the machine tool 3 may be prevented from improperly machining and damaging the workpiece 2.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A control method of a machine tool, the method to be implemented by a machining system that includes the machine tool and a computer connected electrically to the machine tool, the machine tool including a table for supporting a workpiece to be machined, and a tool unit disposed relative to the table and including a tool for machining the workpiece, the computer being programmed to control operation of the machine tool, and storing positional information associated with the tool for machining the workpiece, a stand-by height with respect to a supporting surface of the table, a preset machining height with respect to the supporting surface, a preset first deviation value and a preset second deviation value, the control method comprising the following steps of:

by the computer, determining a raised height with respect to the supporting surface which is lower than the stand-by height, and determining, according to the raised height and the preset first deviation value, a maneuvering height with respect to the supporting surface which is lower than the raised height;

causing, by the computer, the tool to move horizontally to a machining position according to the positional information;

when the tool has arrived at the machining position, causing, by the computer, the tool to move vertically toward the workpiece to the machining height to machine the workpiece;

by the computer, causing the tool to move vertically away from the workpiece to the raised height, and when the tool is at the maneuvering height, causing the tool to move horizontally to a next machining position according to the positional information while the tool is moving vertically away from the workpiece to the raised height;

when it is determined that a horizontal distance between a current position of the tool and the next machining position is equal to the preset second deviation value, causing, by the computer, the tool to move vertically toward the workpiece to the maneuvering height while the tool is moving horizontally to the next machining position; and     when the tool has arrived at the next machining position, causing, by the computer, the tool to move vertically toward the workpiece to the machining height to machine the workpiece.

2. The control method as claimed in claim 1, the computer further storing a preset height setting value, the machine tool further including a brush frame unit and a sensor unit connected electrically to the computer, the brush frame unit being sleeved onto the tool unit and being movable relative to the tool unit when the tool unit is machining the workpiece, the sensor unit being disposed on the tool unit and being used to detect a moving distance of the brush frame unit relative to the tool unit when the workpiece is being machined;

wherein the step of determining a raised height further includes         controlling, by the computer, the machine tool to machine the workpiece a predetermined number of times,         detecting, by the sensor unit, the moving distance of the brush frame unit each time the workpiece is machined,         calculating, by the computer, an average of the moving distances detected the predetermined number of times, and         calculating, by the computer, a total of the average of the moving distances, the machining height and the preset height setting value to serve as the raised height, the maneuvering height being equal to the raised height minus the preset first deviation value.

3. The control method as claimed in claim 1, further comprising:

determining, by the computer, whether the maneuvering height is lower than a safety height with respect to the supporting surface; and     outputting, by the computer, a first notification to indicate that the maneuvering height is improper when it is determined that the maneuvering height is lower than the safety height.

4. The control method as claimed in claim 3, wherein, in the step of determining whether the maneuvering height is lower than a safety height, the safety height is equal to half of the raised height.

5. The control method as claimed in claim 1, further comprising:

determining, by the computer, whether the preset second deviation value is greater than a safety distance; and     outputting, by the computer, a second notification to indicate that the preset second deviation value is improper when it is determined that the preset second deviation value is greater than the safety distance.

6. The control method as claimed in claim 5, wherein, in the step of determining whether the preset second deviation value is greater than a safety distance, the safety distance is equal to half of a horizontal distance between the machining position at which the tool has previously visited and the next machining position.

7. A computer program product comprising a machine readable non-transitory storage medium having program instructions stored therein which when executed cause a machining system to perform a control method of a machine tool, the machining system including the machine tool and a computer connected electrically to the machine tool, the machine tool including a table for supporting a workpiece to be machined, and a tool unit disposed relative to the table and including a tool for machining the workpiece, the computer being programmed to control operation of the machine tool, and storing positional information associated with the tool for machining the workpiece, a stand-by height with respect to a supporting surface of the table, a present machining height with respect to the supporting surface, a preset first deviation value and a preset second deviation value,     wherein the control method includes the following steps of         by the computer, determining a raised height with respect to the supporting surface which is lower than the stand-by height, and determining, according to the raised height and the preset first deviation value, a maneuvering height with respect to the supporting surface which is lower than the raised height,         causing, by the computer, the tool to move horizontally to a machining position according to the positional information,         when the tool has arrived at the machining position, causing, by the computer, the tool to move vertically toward the workpiece to the machining height to machine the workpiece,         by the computer, causing the tool to move vertically away from the workpiece to the raised height, and when the tool is at the maneuvering height, causing the tool to move horizontally to a next machining position according to the positional information while the tool is moving vertically away from the workpiece to the raised height,         when determining that a horizontal distance between a current position of the tool and the next machining position is equal to the preset second deviation value, causing, by the computer, the tool to move vertically toward the workpiece to the maneuvering height while the tool is moving horizontally to the next machining position, and when the tool has arrived at the next machining position, causing, by the computer, the tool to move vertically toward the workpiece to the machining height to machine the workpiece.

\* \* \* \* \*